(12) United States Patent
Dore et al.

(10) Patent No.: US 9,596,118 B2
(45) Date of Patent: Mar. 14, 2017

(54) FBMC RECEIVER USING A METHOD FOR SYNCHRONIZATION IN A FREQUENCY DOMAIN

(71) Applicant: Commissariat a l'energie atomique et aux energies alternatives, Paris (FR)

(72) Inventors: Jean-Baptiste Dore, Saint Martin le Vinoux (FR); Vincent Berg, Corenc (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 0 days.

(21) Appl. No.: 14/771,394

(22) PCT Filed: Mar. 11, 2014

(86) PCT No.: PCT/EP2014/054741
§ 371 (c)(1),
(2) Date: Aug. 28, 2015

(87) PCT Pub. No.: WO2014/140040
PCT Pub. Date: Sep. 18, 2014

(65) Prior Publication Data
US 2016/0013961 A1 Jan. 14, 2016

(30) Foreign Application Priority Data
Mar. 13, 2013 (FR) .................... 13 52212

(51) Int. Cl.
*H04L 27/26* (2006.01)
*H04L 27/38* (2006.01)
*H04L 27/36* (2006.01)

(52) U.S. Cl.
CPC ........ *H04L 27/264* (2013.01); *H04L 27/2652* (2013.01); *H04L 27/2665* (2013.01);
(Continued)

(58) Field of Classification Search
CPC ............. H04L 27/2662; H04L 27/2663; H04L 27/2665; H04L 27/264; H04L 27/2652;
(Continued)

(56) References Cited

U.S. PATENT DOCUMENTS 6,741,551 B1 * 5/2004 Cherubini ............. H04L 5/1438
370/210
7,072,412 B1 * 7/2006 Bellanger ........... H04L 27/2082
375/261

(Continued)

OTHER PUBLICATIONS

U.S. Appl. No. 14/790,708, filed Jul. 2, 2015, Dore.
(Continued)

*Primary Examiner* — Betsy Deppe
(74) *Attorney, Agent, or Firm* — Oblon, McClelland, Maier & Neustadt, L.L.P.

(57) ABSTRACT

A filter bank multi-carrier (FBMC) receiver implementing a synchronization in the frequency domain. The receiver includes a synchronization module including an error estimator on the sampling instants and, for each subcarrier, an interpolating filter for reconstructing the samples at the accurate sampling instants. A phase-shifter is provided, for each subcarrier, at the output of the interpolating filter, to make a phase compensation. The phase-shifter can be followed by an equalizer in the frequency domain.

12 Claims, 10 Drawing Sheets

(52) U.S. Cl.
 CPC ...... *H04L 27/2672* (2013.01); *H04L 27/2684* (2013.01); *H04L 27/2691* (2013.01); *H04L 27/38* (2013.01); *H04L 27/2663* (2013.01); *H04L 27/2675* (2013.01); *H04L 27/362* (2013.01)

(58) Field of Classification Search
 CPC ............. H04L 27/2655; H04L 27/2684; H04L 27/2691; H04L 27/2672; H04L 27/38
 USPC .......................................... 375/260, 261, 316
 See application file for complete search history.

(56) References Cited

U.S. PATENT DOCUMENTS

| | | | | |
|---|---|---|---|---|
| 2010/0303179 | A1* | 12/2010 | Inagawa | H04L 7/0058 375/343 |
| 2012/0243625 | A1* | 9/2012 | Berg | H04L 25/022 375/260 |
| 2015/0009906 | A1 | 1/2015 | Dore et al. | |
| 2015/0063507 | A1 | 3/2015 | Dore et al. | |
| 2015/0124749 | A1 | 5/2015 | Mawlawi et al. | |
| 2015/0146770 | A1 | 5/2015 | Dore et al. | |

OTHER PUBLICATIONS

Faria Da Rocha, C. A., et al., "Sub-Channel Equalizer Design Based on Geometric Interpolation for FBMC/OQAM Systems", IEEE, XP31997867, (2011), pp. 1279-1282.
Louveaux, J., et al., "Capacity Sensitivity of Filter Bank Based MC VDSL Transmission to Timing Errors", IEEE, XP10316744, (1998), pp. 235-240.
Wang, L., et al., "A Simplified Interpolation Equalization Technique for Filterbank-Based DMT Systems", IEEE, XP10653975, (2003), pp. 2063-2066.
Hirosaki, B., "An Orthogonally Multiplexed QAM System Using the Discrete Fourier Transform", IEEE Transactions on Communications, vol. 29, No. 7, (1981), pp. 982-989.
Siohan, P., et al., "Analysis and Design of OFDM/OQAM Systems Based on Filterbank Theory", IEEE Transactions on Signal Processing, vol. 50, No. 5, (2002), pp. 1170-1183.
Stitz, T. H., et al., "Practical Issues in Frequency Domain Synchronization for Filter Bank Based Multicarrier Transmission", ISCCSP, (2008), pp. 411-416.
French Search Report Issued Jan. 6, 2014 in French Application No. 1352212 Filed Mar. 13, 2013.
International Search Report Issued Jun. 26, 2014 in PCT/EP2014/054741 Filed Mar. 11, 2014.

\* cited by examiner

FBMC RECEIVER USING A METHOD FOR SYNCHRONIZATION IN A FREQUENCY DOMAIN

TECHNICAL FIELD

The present invention generally relates to the field of telecommunication systems using a filter bank multi-carrier modulation, also called FBMC (Filter Bank Multi-Carrier) systems.

STATE OF PRIOR ART

Telecommunication systems using a multi-carrier modulation are known in the state of the art. The principle of such a modulation consists in dividing the transmission band into a plurality of frequency sub-channels associated with sub-carriers and modulating each of these subcarriers by the data to be transmitted.

The most common multi-carrier modulation is undoubtedly the OFDM (Orthogonal Frequency Division Multiplexing) modulation. It is implemented in wireless local networks WLAN, Wi-Fi, in wireless broad band internet access (WiMAX), digital broadcast systems (DVB-T, ISDB-T, DAB), asymmetric digital links (xDSL), etc.

In an OFDM transmission system, each block of OFDM symbols is preceded by a guard interval or a cyclic prefix, having a length higher than the time spread of the impulse response of the channel, so as to remove the intersymbol interference. The insertion of a guard interval or a prefix however leads to a loss of spectral efficiency. Finally, since the spectral occupancy of an OFDM signal is substantially higher than the subcarrier band it uses because of the spread of the side lobes, the OFDM modulation is not an optimum solution for applications requiring strong out-of-band rejection rates.

More recently, a filter bank multi-carrier (FBMC) modulation has been suggested as an alternative to the OFDM modulation.

The principle of the FBMC modulation is based on a synthesis by a filter bank upon transmission and an analysis by a filter bank upon reception.

FIG. 1 schematically represents the structure of a first FBMC transmitting/receiving system known in the state of the art.

This structure resorts to a so-called transmultiplexer configuration described hereinafter.

At the transmitter, the modulation symbols to be transmitted with a rate f are gathered by blocks of a size N=2M, $x_0[n], \ldots, x_{N-1}[n]$, where n is the time index of the block. Each block of N symbols is provided in parallel to N input channels of a pre-processing module 110, called OQAM (Offset QAM) pre-processing detailed later.

Each output channel of the OQAM module is, in 120 and 125, oversampled by a factor N/2.

The different channels are then filtered by means of a polyphased filter bank 130, having respective impulse responses $g_k$, $k=0, \ldots, N-1$, the polyphased filters being derived from a base filter, called prototype filter, with an impulse response g, as follows:

$$g_k[n] = g[n]\exp\left(j\frac{2\pi k}{M}\left(n - \frac{L-1}{2}\right)\right) \quad (1)$$

where L is the length of the prototype filter (in number of samples). It will be understood in the expression (1) above that the impulse response of the filter $g_k$ is given by the samples $g_k[n]$ at the sampling frequency f.

In practice, the prototype filter is designed such that its length is equal to a multiple of N, but for one sample, in other words L=KN or L=KN−1 or even L=KN+1, K being an integer number of blocks, having a low value, for example K=3, 4, or 5. In view of the oversampling factor, the duration of the impulse responses of the synthesis filters is in the order of K blocks or equivalently K FBMC symbols.

The signals at the output of the polyphased filters are summed in 140 and the resulting signal is transmitted on the transmission channel 150.

At the receiver, the received signal is filtered using an analysis filter bank 160, having impulse responses, $f_k$, $k=0, \ldots, N-1$, each analysis filter matching the corresponding synthesis filter, that is $f_k[n]=g_k^*[n]$.

The outputs of the analysis filters are decimated by a factor N/2 in 170 and the samples thus obtained are transmitted on N channels parallel to an OQAM post-processing module, 180, detailed hereinafter.

The structure of the OQAM pre-processing module has been illustrated in FIG. 2A.

For the sake of simplification, only the pre-processing made by this module for a channel k with an even rank and a channel k with an odd rank has been represented in this figure.

The symbol $x_k[n]$ on the channel k is decomposed into its real part and its imaginary part, the real and imaginary parts being then oversampled by a factor 2 in 220.

When k is even, the imaginary part is further delayed by a sampling period $$\left(\frac{N}{2f}\right)$$

before summation with the real part in 230. Conversely, when k is odd, the real part is delayed by a sampling period $$\left(\frac{N}{2f}\right)$$

before summation with the imaginary part in 230.

Regardless of the parity of k, data at the output of the adder 230 consist of the real and imaginary parts of the input symbols, which are time-interleaved. These real data are respectively multiplied in 240 by the elements of a complex sequence, for example the sequence defined by $\theta_k^n = j^{n+k}$ or even $\theta_k^n = 1, j, 1, j, \ldots$ if k is even and $\theta_k^n = j, 1, j, 1 \ldots$ if k is odd. It is thus understood that, after multiplication, the samples of a channel k are alternately real and imaginary. Likewise, for a given instant, the samples of different successive channels are alternately real and imaginary.

The structure of the OQAM post-processing module has been illustrated in FIG. 2B.

Once again, the post-processing for a channel k having an even rank and for a channel k having an odd rank has been represented.

The post-processing consists in multiplying the successive data of the channel k by the conjugated elements of the sequence $\theta_k^n$, as represented in 250, and then taking the real part of the result obtained.

Only retaining the real part of the signal at the output of the analysis filters allows not to have to respect an orthogonality between filters (unlike the orthogonality between subcarriers of an ODFM signal).

When the rank k of the channel is even, the samples are then multiplexed and recombined in 290 after the odd samples have been multiplied by j, in 270, so as to reconstitute the QAM symbols.

Conversely, when the rank k of the channel is odd, the samples are then multiplexed and recombined in 290 after the even samples have been multiplied by j, in 270, so as to reconstitute the QAM symbols once again.

The FBMC filter bank enables the frequency response of each carrier and thus the frequency response to choose individually on the entire signal band. In particular, the prototype filter can be chosen so as to have abrupt flanks and ensure a strong out-of-band rejection rate.

FIG. 3 schematically represents the structure of a second FBMC transmitting/receiving system known to the state of the art.

This structure has been described in detail in the article of B. Hirosaki entitled "An orthogonally multiplexed QAM system using the discrete Fourier transform" published in IEEE Trans on Comm., vol. 29 No. 7, pp. 982-989, July 1981, as well as in the article of P. Siohan et al. entitled "Analysis and design of OFDM/OQAM systems based on filterbank theory" published in IEEE Trans. on signal processing, vol. 50, No. 5, pp. 1170-1183, May 2002.

The transmitting system of FIG. 3 comprises, on the one hand, a transmitter consisting of an OQAM pre-processing module 310, identical to the module 110 of FIG. 1, and a synthesis filter bank 320, and, on the other hand, a receiver made of an analysis filter bank 360, and a post-processing module 380 identical to the post-processing module 180 of FIG. 1.

The synthesis filter bank 320 is made of an IFFT (inverse fast Fourier transform) module 330, a plurality N of polyphased filters 333 the impulse responses of which are given by the expression (1), a plurality of oversamplers 335 at the output of different polyphased filters, a plurality of delays 337, arranged in parallel and ranging from 0 to (N−1) sampling periods, the oversampled and delayed outputs of the polyphased filters being summed by the adder 339 before the transmission on the channel 350.

On the receiver side, the analysis filter bank 360 comprises a plurality of delays 363, arranged in parallel and ranging from 0 to (N−1) sampling periods, in the order reverse to the delays 337. The streams of samples from different delays are then decimated by a factor N/2 by the decimators 365 and then filtered by the analysis filters 367. The analysis filters have an impulse response which is conjugated and is temporally reverse with respect to the corresponding synthesis filter. Given that the prototype filter has real and symmetric values by time reversal, it can be shown that an analysis filter has the same impulse response as the corresponding synthesis filter. The symbols at the output of the synthesis filters are then fast Fourier transformed (FFT) in 370, the different frequency components of the FFT being then provided to the post-processing module 380.

FIG. 4 illustrates the waveform of the signal at the output of the transmitter of FIG. 3, when a packet of FBMC symbols is transmitted on the transmission channel. By FBMC symbol, it is meant the signal generated at the output of the transmitter, corresponding to a block of symbols $x_0[n], \ldots x_{N-1}[n]$.

It is noted in the figure that the signal at the output of the transmitter comprises a first part 421, corresponding to the rise time of the prototype filter, extending on (K−1)/2 FBMC symbols, a second part 420 corresponding to the packet transmitted, and a third part 430, corresponding to the fall time of the prototype filter, also extending on (K−1)/2 FBMC symbols.

One of the difficulties of the systems using the FBMC modulation resides in synchronizing the receiver.

This synchronization comprises two steps.

First, the receiver has to synchronize its sampling instants to those of the transmitter. Then, it has to be set in time and frequency to the beginning of each FBMC packet. Generally, for this, a preamble located at a predetermined time interval of the beginning of the useful data packet is used, by providing a silence during this interval, the length of this interval being chosen higher than the fall time of the prototype filter such that the preamble does not interfere with the useful data.

FIG. 5 schematically represents the waveform of a signal at the output of the transmitter of FIG. 3 when such a synchronization preamble is provided. In this figure, the preamble 510, the silence period 520, and the useful data packet 530 are distinguished.

Most of the synchronization methods proposed for the FBMC receivers operate in the time domain. Thus, it is possible to provide in the preamble a learning sequence repeating in time with a predetermined periodicity and to make an autocorrelation of the received signal so as to detect both the sampling instants and the time position of the preamble. Since the time offset between the preamble and the packet is known, the beginning of the FFT is set to the beginning of the packet.

This synchronization method has however several drawbacks.

First, the determination of the autocorrelation function peak is not very precise, in particular in the presence of noise on the transmission channel.

Then, if this synchronization method is not adapted when the receiver receives the signal from several users, as it is in particular the case on the uplink of a cellular system (base station receiving several simultaneous uplink communications), the packets from the different users are generally offset in time. It is then necessary to determine the beginning of each packet and to provide as many analysis filter banks as there are users, a complex solution which cannot be implemented in practice.

Alternatively, the synchronization of the FBMC receiver can operate in the frequency domain. In this case, switching to the frequency domain is continuously made, on the fly, and the beginning of the FFT occurs at any moment. The synchronization is then made after the FFT, in the frequency domain.

A synchronization method of the FBMC receiver operating in the frequency domain has been proposed in the article of T. H. Stitz et al. entitled "Practical issues in frequency domain synchronization for filter bank based multicarrier transmission", published in Proc. of. ISCCSP, 2008, pp. 411-416, 12-14 Mar. 2008. This proposed method further enables an equalization in the frequency domain to be made, subcarrier by subcarrier.

The receiver resorts to a learning sequence (sequence of pilot symbols) for each subcarrier and to a correlator per subcarrier. The synchronization is made by means of a phase compensation made for each equalizer, subcarrier by subcarrier, and is thus relatively complex.

The purpose of the present invention is to provide a FBMC receiver using a synchronization method operating in the frequency domain, particularly simple to implement, optionally possibly after a coarse synchronization has been made in the time domain.

A subsidiary purpose of the present invention is to allow an equalization of the signal received by the receiver, which is particularly simple to implement.

DISCLOSURE OF THE INVENTION

The present invention is defined by a multi-carrier signal receiver synthesized by a synthesis filter bank, said receiver comprising a plurality of analysis filters for analysing said signal, after sampling at sampling instants, the outputs of the filters being connected to a Fourier transform module providing, for a plurality of subcarriers, samples in the frequency domain. The multi-carrier signal receiver comprises:

an error estimation module on the sampling instants, receiving said samples for at least one subset of said plurality of subcarriers and for a plurality of said sampling instants, and providing an estimation of said error;

and, for each subcarrier of said plurality of subcarriers:

an interpolating filter, receiving the estimation of said error and interpolating samples of a subcarrier to provide an interpolated sample at an error-corrected sampling instant.

Advantageously, the error estimation module on the sampling instants makes for each carrier of said subset of carriers an estimation of the impulse response at the frequency of this subcarrier of a set constituted by the synthesis filter bank, the transmission channel, and the analysis filter bank from pilot symbols, and calculates a metric from the impulse responses thus estimated.

The metric is preferably a quadratic sum of said impulse responses for the subcarriers of said subset, said metric being calculated at three consecutive sampling instants to give three metric values, the error estimation module determining the instant at which a parabolic function, passing through the three metric values at these three instants, reaches its maximum and by deducing therefrom the error on the sampling instants.

Alternatively, the metric can be a correlation of said impulse responses for the subcarriers of said subset, the error estimation module determining the error on the sampling instants from the phase of the correlation result.

Advantageously, the subset of the subcarriers for the calculation of the metric can consist of subcarriers the module of the impulse response of which is higher than a predetermined threshold.

According to a first exemplary embodiment, the interpolating filter uses a spline-type interpolation function, said function being identical for the plurality of subcarriers.

According to a second exemplary embodiment, the interpolating filter uses a Lagrange interpolation polynomial, the coefficients of said polynomial being identical for the plurality of subcarriers.

According to an advantageous embodiment, the receiver further comprises an OQAM post-processing module, an OQAM symbol being represented by two consecutive samples of a same subcarrier, the interpolating filter comprising a first module interpolating the real parts of a plurality of successive samples and a second module interpolating the imaginary parts of said plurality of successive samples.

For each subcarrier, the interpolating filter is advantageously followed by a phase-shift module making a phase compensation of the samples interpolated by means of a multiplication by a phase term $\exp(-j\phi(k))$ where $\phi(k)$ is proportional to the frequency of the subcarrier (k) and to the error on the sampling instants.

Further, for each subcarrier, the phase-shift module can be followed by an equalizer in the frequency domain.

Advantageously, said signal consists of frames, each frame comprising a preamble followed by a useful data packet, the preamble comprising a plurality of pilot symbols on subcarriers, called active subcarriers, of said plurality of subcarriers, each pilot symbol being surrounded by a time and frequency guard ring, the receiver determining the energy received on said active subcarriers and opening a time window when this energy crosses a predetermined threshold, the receiver then determining the beginning of said packet when the energy of the received signal reaches a maximum.

Also advantageously, said frame signal consists of frames, each frame comprising a preamble followed by a useful data packet, the preamble comprising, for at least one carrier, a synchronization sequence, the receiver comprising a synchronization module in the time domain, this module receiving the samples at the input of the Fourier transform module and making a correlation with said synchronization sequence to obtain a correlation peak, and making a synchronization of the beginning of the Fourier transform from the position of the correlation peak thus obtained.

BRIEF DESCRIPTION OF THE DRAWINGS

Further characteristics and advantages of the invention will appear upon reading preferential embodiments of the invention, with reference to the appended figures in which.

DETAILED DISCLOSURE OF PARTICULAR EMBODIMENTS

Figure 1:
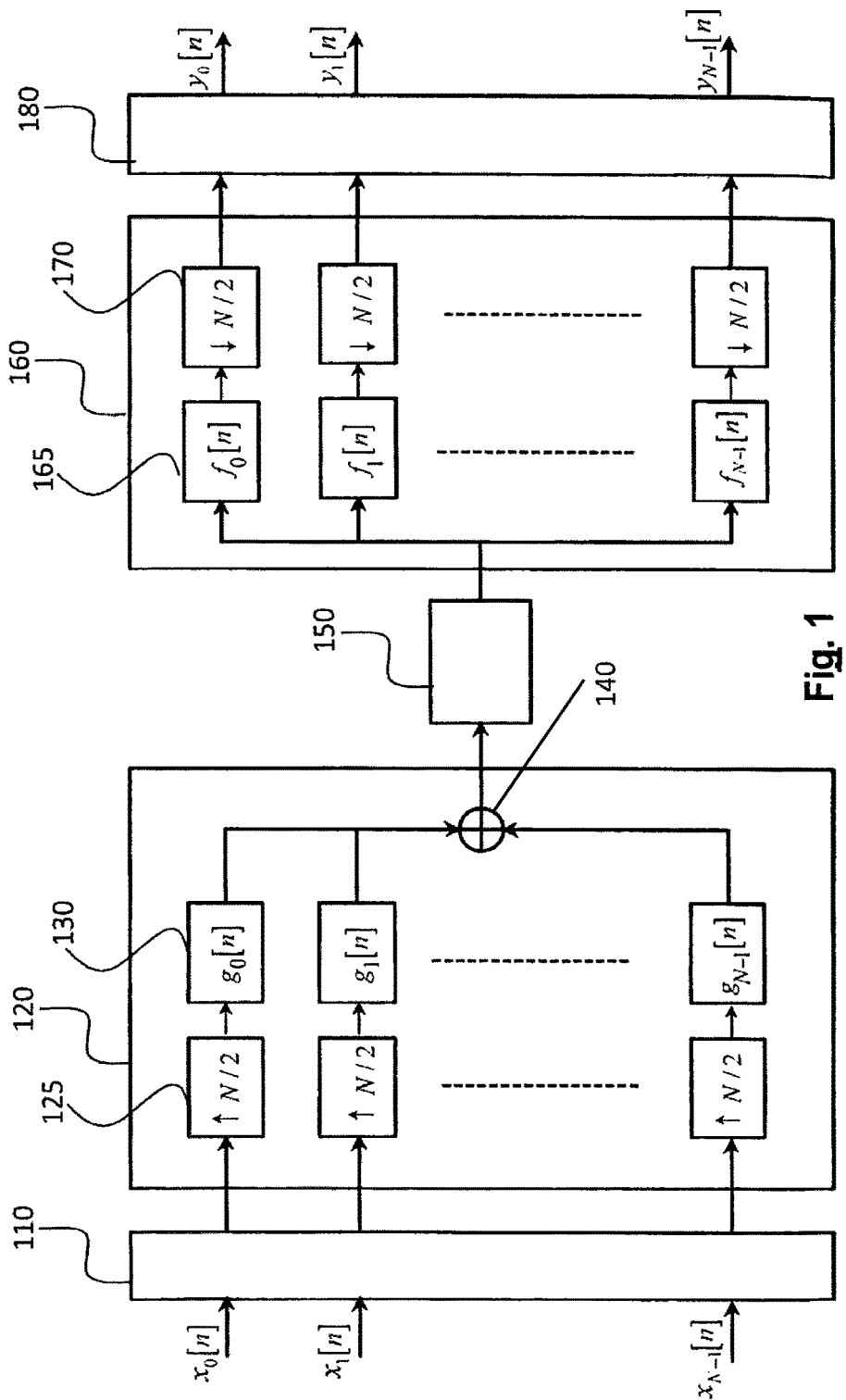
FIG. 1 represents the structure of a first FBMC transmission/reception system known from the state of the art.
Figure 2A:
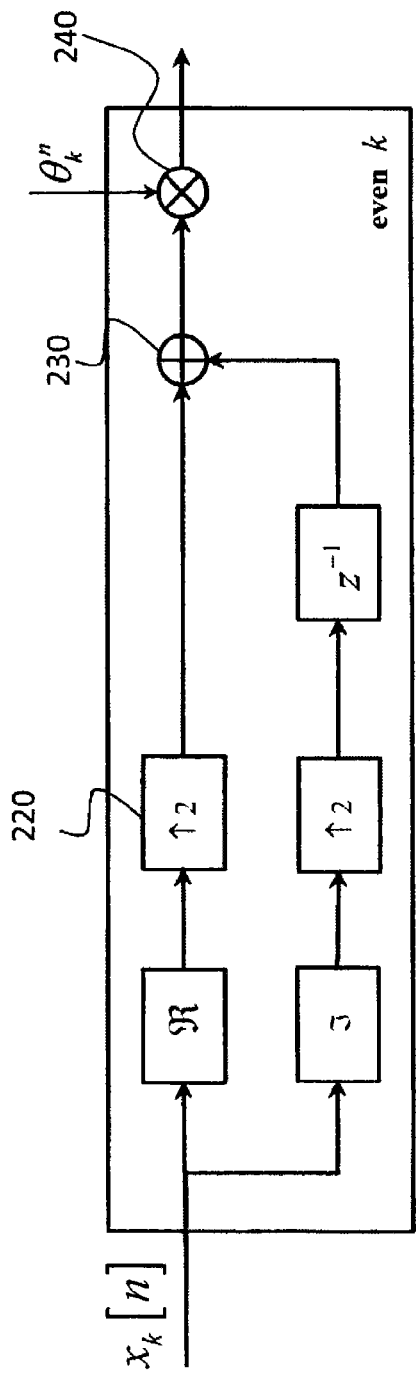
FIG. 2A schematically represents the pre-processing module of the system of FIG. 1.
Figure 2A:
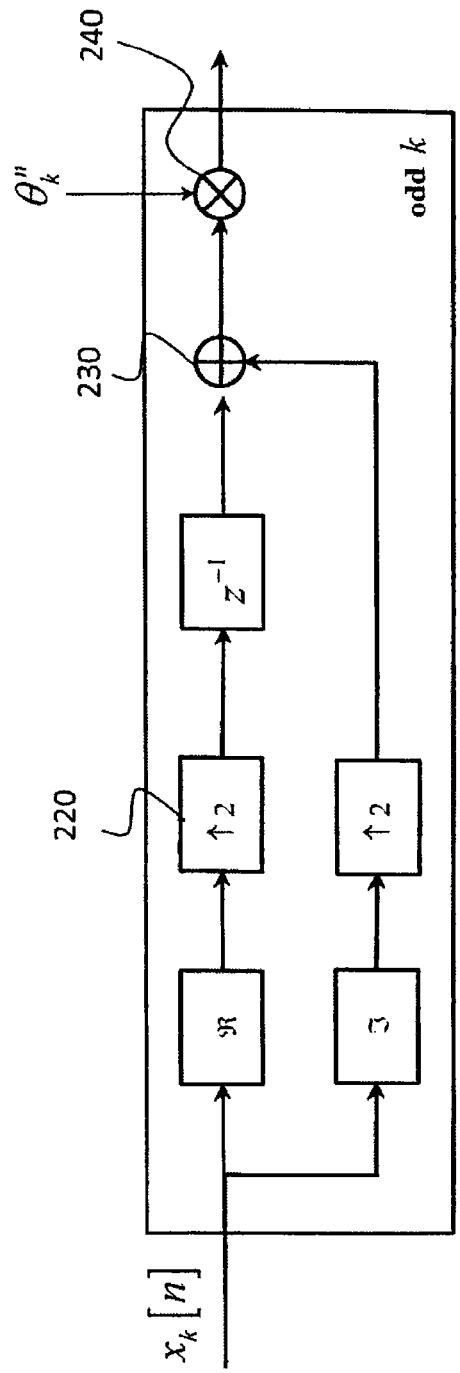
Figure 2B:
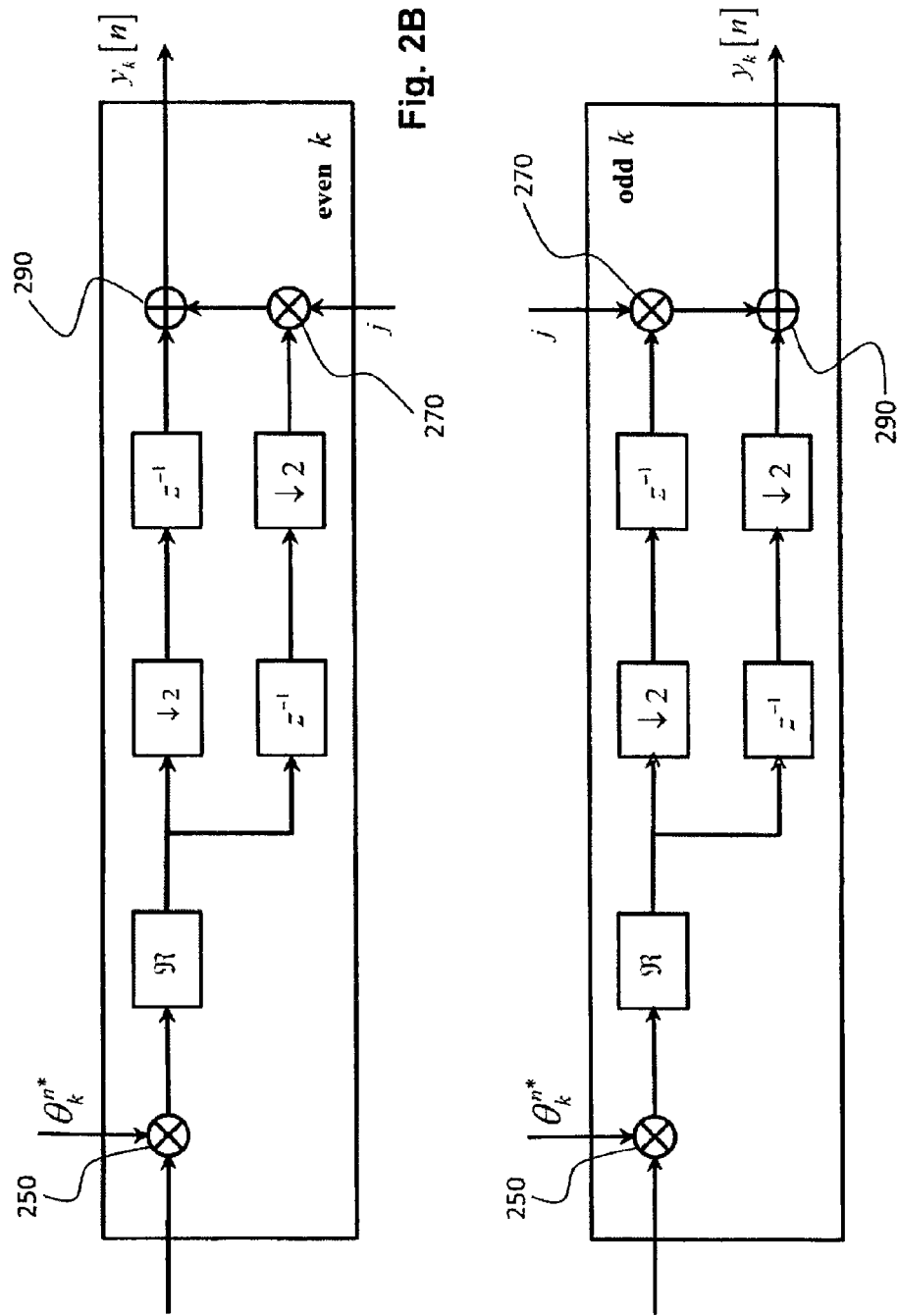
FIG. 2B schematically represents the post-processing module of the system of FIG. 1.
Figure 3:
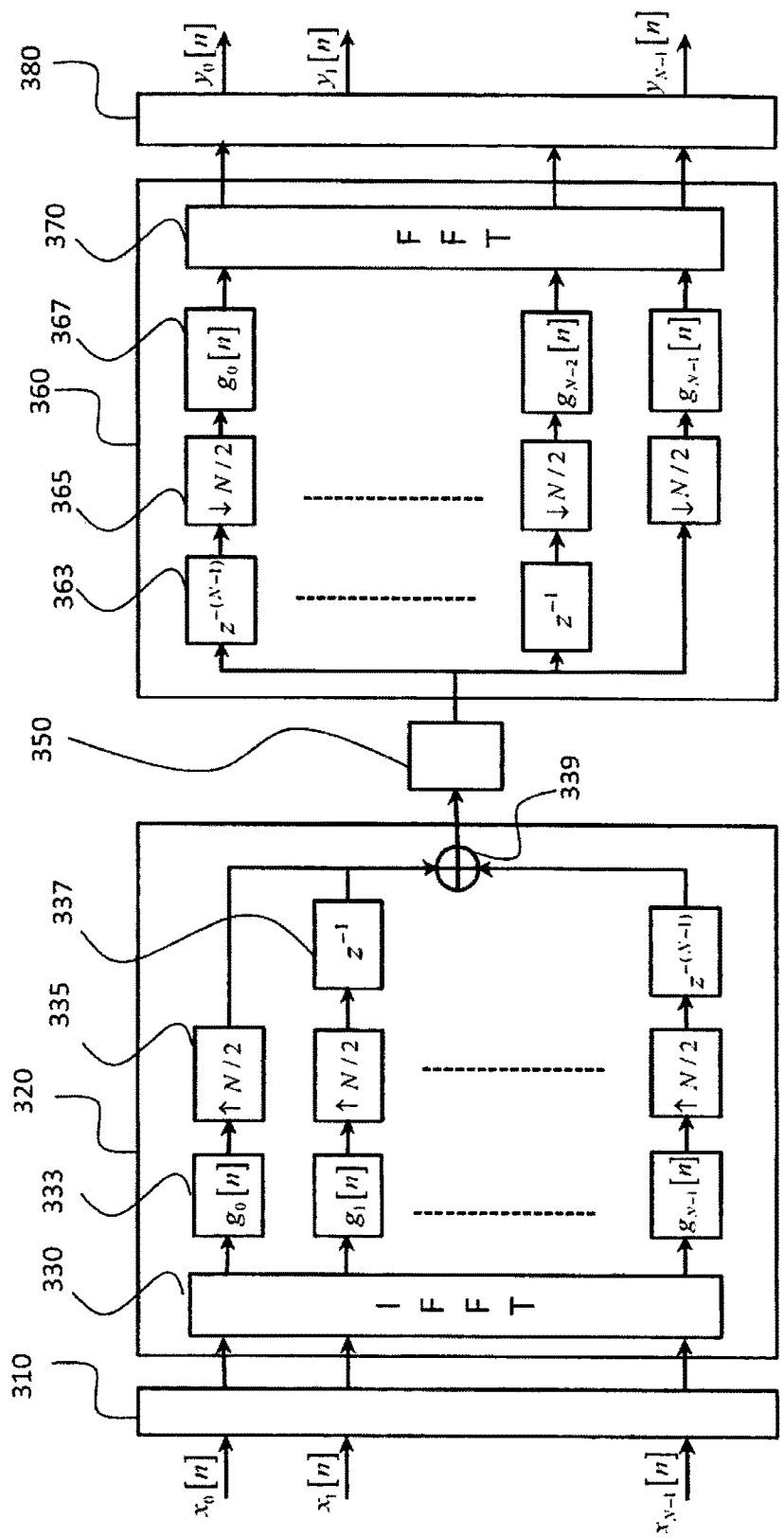
FIG. 3 represents the structure of a second FBMC transmission/reception system known from the state of the art.
Figure 4:
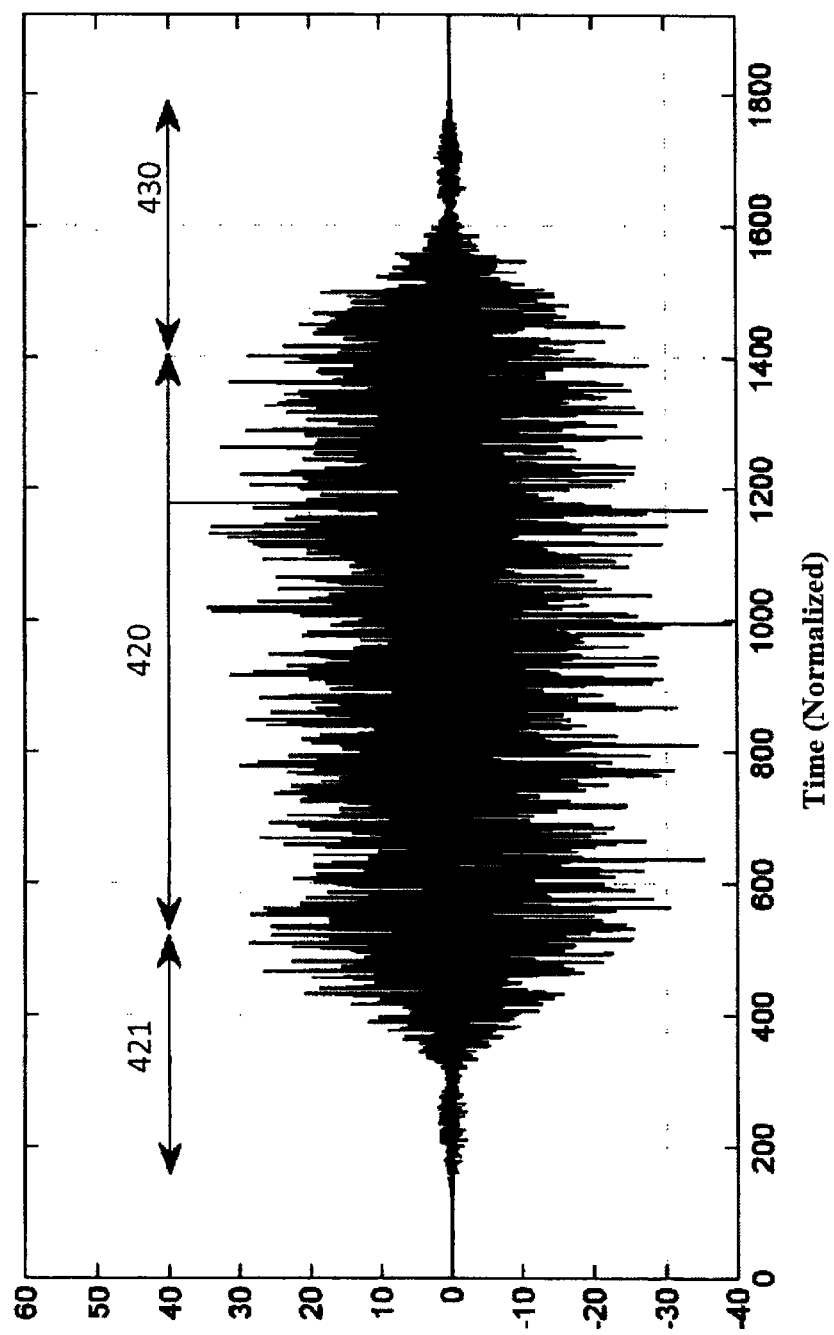
FIG. 4 illustrates the waveform of the signal at the output of the transmitter of FIG. 3.
Figure 5:
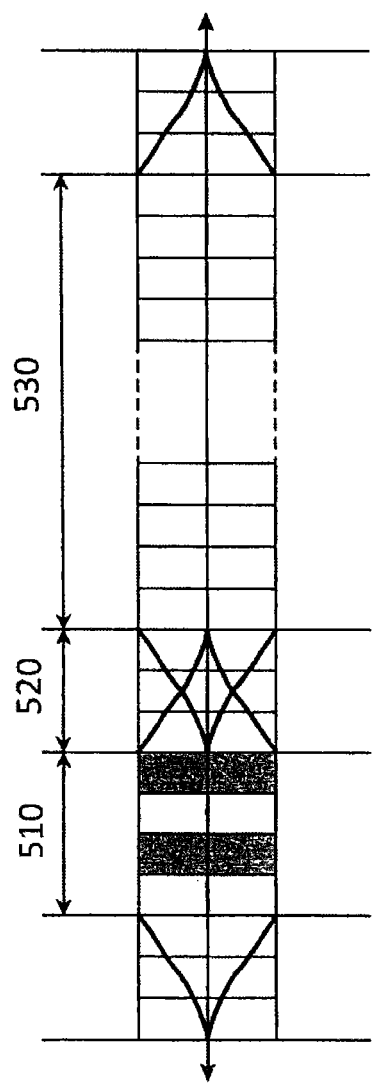
FIG. 5 illustrates the waveform of the signal at the output of the transmitter of FIG. 3 when a synchronization preamble is provided.
Figure 6:
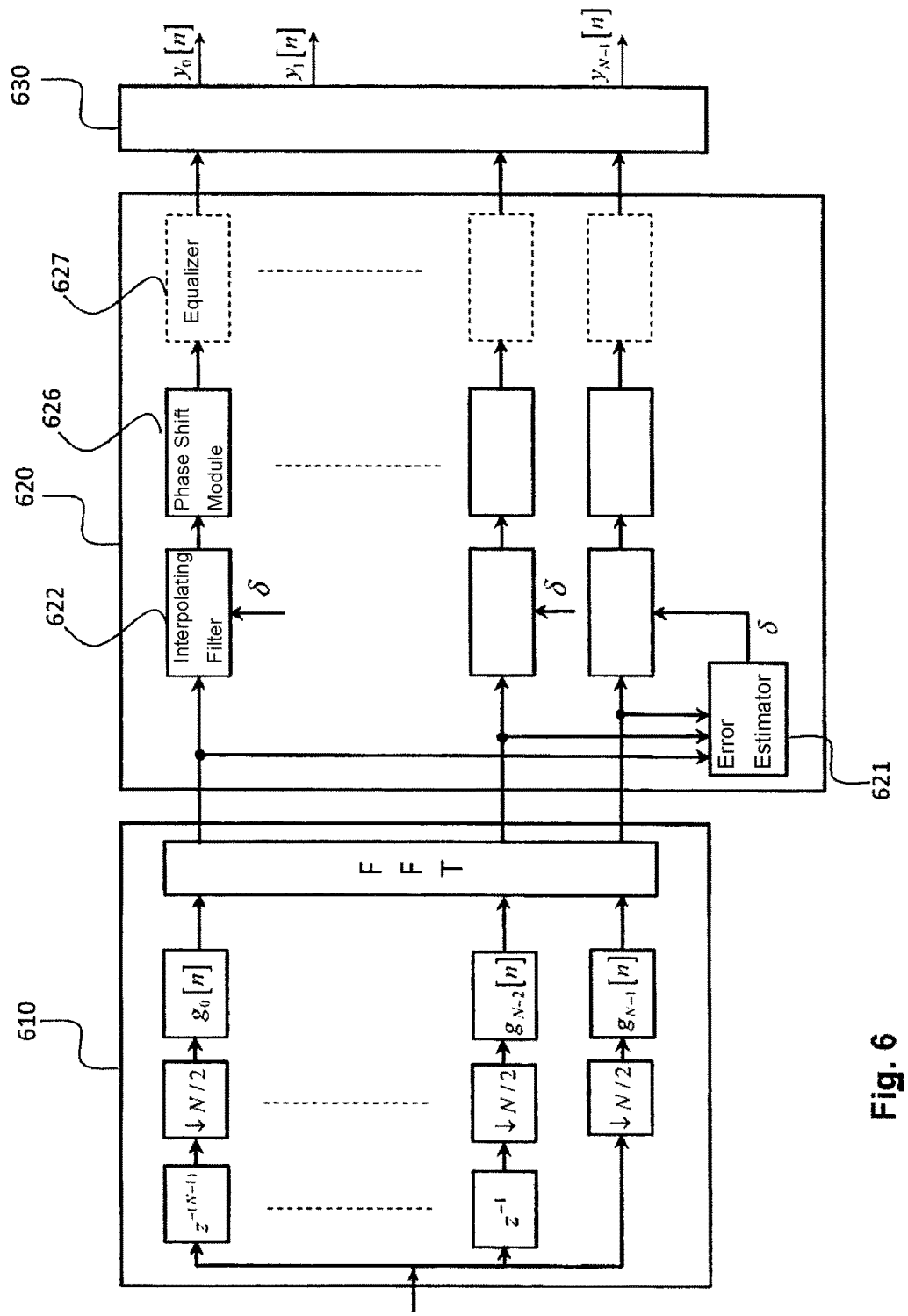
FIG. 6 schematically represents a FBMC receiver using a synchronization method in the frequency domain, according to a first embodiment of the invention.

FIG. 6 represents a FBMC receiver according to one embodiment of the invention. This receiver comprises an analysis filter bank 610 identical to the filter bank 360 of FIG. 3, a synchronization module 620, as well as a post-processing module 630, identical to the post-processing module 380 of FIG. 3.

The FTT module makes the FFT on the fly, that is without prior alignment at the beginning of a data packet.

The synchronization module receives the samples from frequency bins of the FFT module, each bin being associated with a subcarrier. It consequently operates in the frequency domain.

For a given frequency bin, the sample sequence represents a subcarrier signal, a QAM symbol transmitted by the transmitter on the frequency of the subcarrier corresponding to two successive quadrature samples.

The idea underlying the invention is to make an interpolation between successive symbols (at the output of the FFT), after the error has been estimated on the sampling instants.

For this, the synchronization module 620 comprises an error estimator on the sampling instants 621 and, for each subcarrier k, an interpolating filter 622 receiving the error thus estimated, followed by a phase-shift module 626. This phase-shift module can be optionally followed by an equalizer 627.

Thereafter, a given subcarrier k is considered and $R_g^k$ denotes the convolution between the synthesis filter $g_k$ and the corresponding analysis filter.

When the sampling upon reception does not coincide with the instants when the samples are actually received, as a result, there is an error on the values of the successive samples.

Figure 7A:
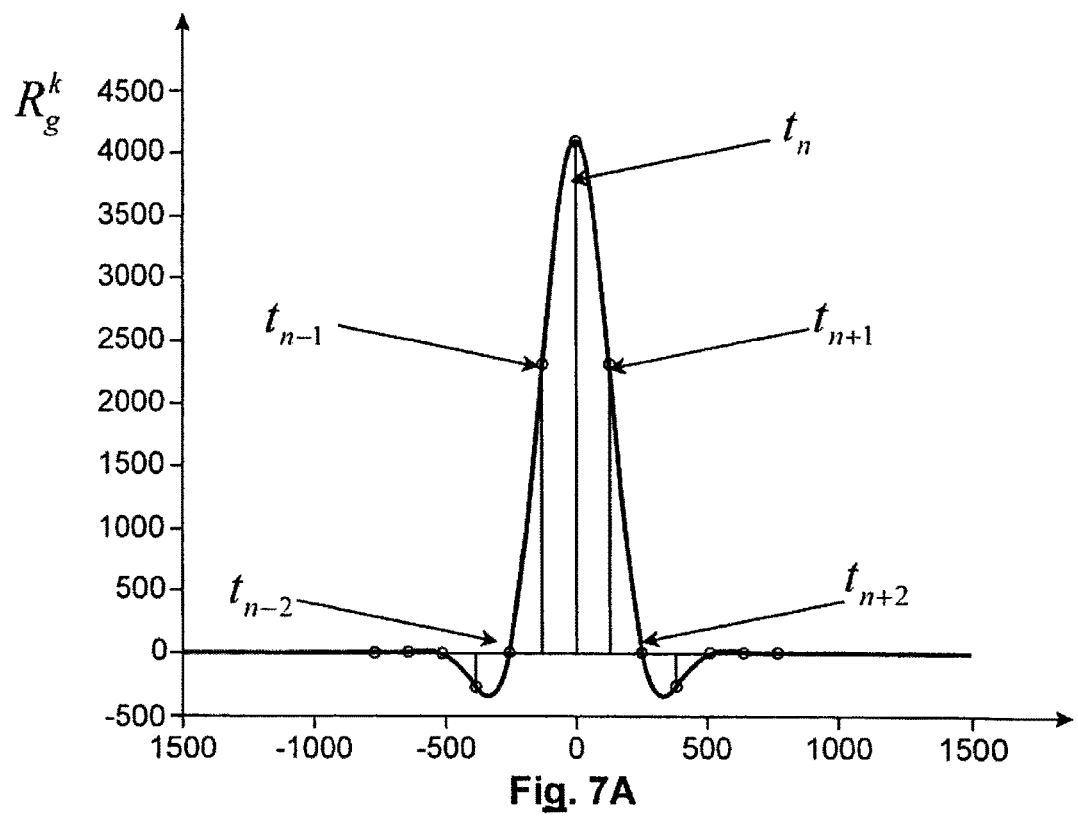
FIGS. 7A and 7B respectively illustrate the situation of a synchronized receiver and a receiver having a synchronization error.

FIG. 7A illustrates the situation where the sampling instants coincide with those when the samples are received. More precisely, FIG. 7A represents the function $R_g^k$ for a transmitted sample. The sampling instant $t_n$ herein coincides with the maximum of the function $R_g^k$. It is noticed that the values of $R_g^k$ are not null at the instants $t_{n-1}$ and $t_{n+1}$. However, it will be noted that these values do not create interference, given that the samples received on the same channel at the instants $t_{n-1}$ and $t_{n+1}$ are purely imaginary if the sample received at the time $t_n$ is real, and conversely. Further, since the values of $R_g^k$ are null at the instants $t_{n-2}$ and $t_{n+2}$, no interference is generated at these instants either.

Figure 7B:
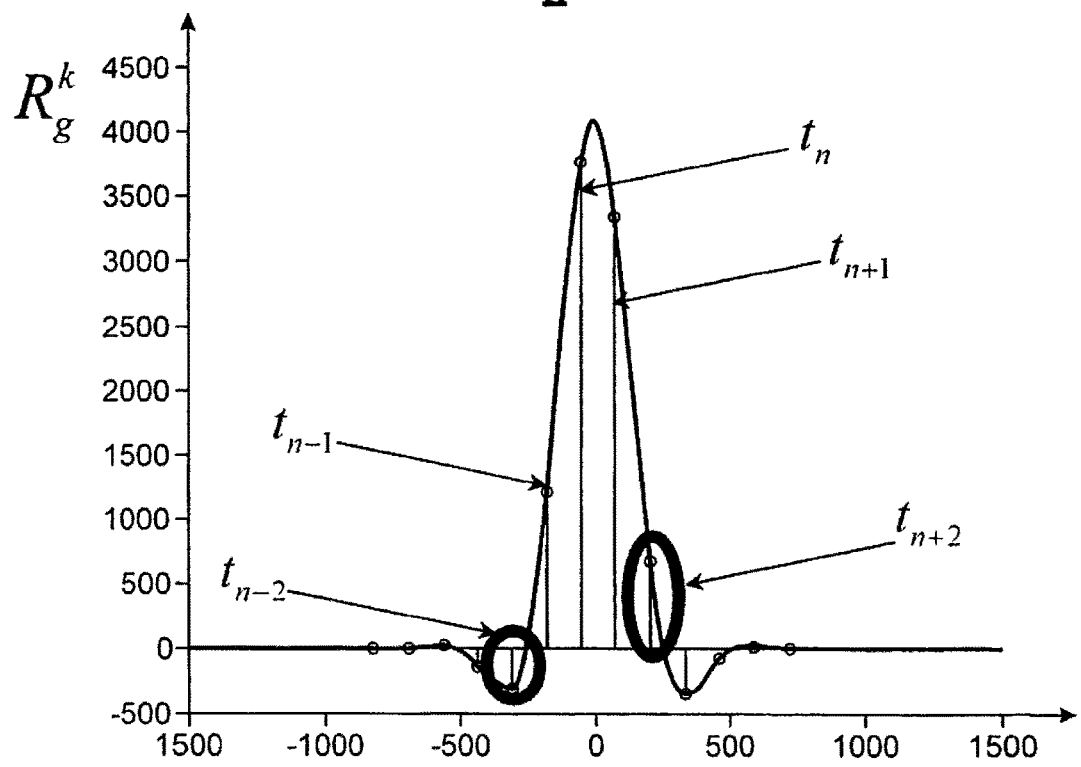

FIG. 7B illustrates the situation where the receiver makes an error τ on the sampling instant $t_n$.

It is noted that the sampling instant $t_n$ does not correspond any longer to the maximum of the function $R_g^k$ and that interference is generated at the instants $t_{n-2}$ and $t_{n+2}$.

The interpolating filter makes an interpolation between successive samples provided by a demultiplexer (not shown). More precisely, the interpolating filter comprises a first interpolation module interpolating the samples on the real axis and a second interpolation module on the quadrature axis. Since the response $R_g^k$ is substantially identical for two successive samples, it can be considered that the interpolation function is the same on both these axes.

The interpolation can be made by means of an interpolation function $\Lambda^k(t)$, for example a spline function or a Lagrange polynomial function, in a manner known per se. The interpolation function is determined so as to pass through the values of the plurality of samples.

Thus, if $y_{n-v}^k, \ldots, y_{n-1}^k, y_n^k, y_{n+1}^k, \ldots, y_{n+v}^k$ denotes a series of 2v+1 successive samples at the input of the interpolating filter, with v≥1, this filter can make an interpolation between 2v+1 samples using the Lagrange polynomial:

$$\Lambda^k(t) = \sum_{i=-v}^{+v} y_{n+i}^k \prod_{j=-v}^{+v} \frac{t - t_{n+j}}{t_{n+i} - t_{n+j}} \quad (2)$$

where $t_n$ is the instant associated with the sample $y_n^k$.

From the error τ on the sampling instants, the interpolating filter determines for each sample $y_n^k$, the corrected value:

$$\tilde{y}_n^k = \Lambda^k(t_n + \tau) \quad (3)$$

It will be understood that the value $\tilde{y}_n^k$ will be either real or imaginary, depending on the parity of n.

It is important to note that the interpolation functions $\Lambda^k$ are identical for all the subcarriers, in other words:

$$\Lambda^k = \Lambda, k = 0, \ldots, N-1 \quad (4)$$

Thus, the calculation of the interpolation function will only be able to be made once for all the N subcarriers. Alternatively, the calculation will be able to be made on a set of carriers and the coefficients of the interpolation polynomials will be able to be averaged on this set.

In any case, a series of interpolated samples $\tilde{y}_n^k$ is provided at the input of the phase-shift module 626.

The interpolation re-sampling as described above enables the inter-symbol interference to be restricted. The inter-symbol interference rejection will depend on the quality of the interpolating filter.

On the other hand, this re-sampling does not enable to correct the phase error due to the time misalignment of the analysis filter bank with the synthesis filter bank, in other words to compensate for the phase error due to the time misalignment τ of the impulse response of the analysis filter with respect to that of the corresponding synthesis filter. Thus, for a given subcarrier k, the result of the convolution between the synthesis filter and the analysis filter at the time $t_n$, in view of (1), is expressed, at the output of the FFT, by:

$$R_g^k[n] = g_k[n]g_k^*[n-\delta] = g[n]g^*[n-\delta]\exp\left(j\frac{2\pi k\delta}{M}\right) \quad (5)$$

where δ=τ/T denotes the error on the sampling instant expressed in (decimal) number of the sampling period T.

It is noted that, when δ is an integer multiple of M, the phase term at the right of the expression (5) disappears. In this case, the sampling instants at the receiver correspond to the instants at which the samples transmitted by the transmitter are received.

On the other hand, if the sampling instant is not accurate, a phase ramp $$\phi(k) = \frac{2\pi k\delta}{M}$$

appears on the different subcarriers, at the output of the FFT.

For a given subcarrier k, the interpolated samples $\tilde{y}_n^k$ at the input of the phase-shift module 626 are phase-shifted in the phase-shift module 626. More precisely, the phase-shift module makes a phase compensation by means of a multiplication by the phase term $\exp(-j\phi(k))$.

Optionally, the phase-shift module can be followed by an equalizer, 627, in the frequency domain. This equalizer can operate on two successive symbols (that is on successive samples having ranks with a same parity) or on a plurality P of successive samples (linear filter with P samplings). The equalizer can implement a ZF (Zero Forcing)- or MMSE (Minimum Mean Square Error)-type equalization method in a manner known per se.

The error estimator on the sampling instants 621 makes an estimation of the impulse response of the synthesis filter bank, channel, analysis filter bank set at the frequency of each subcarrier k, as detailed later.

If the channel spread is low with respect to the duration of the FBMC symbol, the aforesaid impulse response for the subcarrier k can be expressed in the following form:

$$h_k[n] = \alpha_k R_g[n] \quad (6)$$

where $R_g[n] = g[n]\,g[n]$ is the autocorrelation function of the prototype filter and $\alpha_k$ is the channel coefficient at the frequency of the subcarrier k.

The error estimator on the sampling instants, 621, makes the calculation of a metric obtained by quadratically summing the impulse responses relating to the different subcarriers:

$$T[n] = \sum_k |h_k[n]|^2 = |R_g[n]|^2 \sum_k |\alpha_k|^2 \quad (7)$$

This summation can relate to all the subcarriers or can be restricted to those that do not undergo a high fading. Given that the autocorrelation function intervenes identically for all the subcarriers, this amounts to determining the subcarriers k, such that $|h_k[n]|^2 > \lambda$, where $\lambda$ is a predetermined threshold.

It can be shown that the metric $T[n]$ is maximum and reaches the value given by the expression (7) when the error on the sampling instant is null.

The error estimator on the sampling instants 621 calculates the metric $T[n]$ defined by (7) for three consecutive samples, that is $T[n-1]$, $T[n]$, and $T[n+1]$ and determines the instant at which this metric reaches its maximum.

Figure 8:
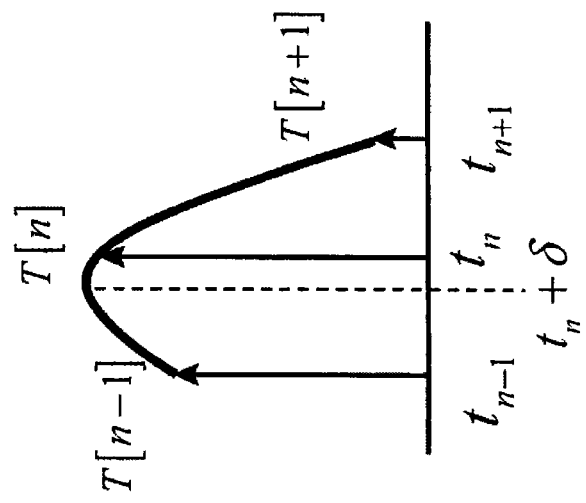
FIG. 8 represents a metric used in a module of FIG. 6 to determine an error on the sampling instants.

To do this, the parabola passing through the points ($t_{n-1}$, $T[n-1]$), ($t_n$, $T[n]$), ($t_{n+1}$, $T[n+1]$) is considered as illustrated in FIG. 8. The maximum of the parabola is reached at the instant $t_n + \delta.T$ such that:

$$\delta = \frac{T[n+1] - T[n-1]}{T[n+1] + T[n-1] - 2T[n]} \quad (8)$$

where $\delta$ represents the error on the sampling instants, as a fractional number of the sampling period.

Alternatively, the error $\delta$ on the sampling instants can be determined by the estimator 621 from the correlation between impulse responses relating to different subcarriers. If $h_k[n]$ and $h_{k+m}[n]$ denote the impulse responses of the synthesis filter, channel, analysis filter set, for the subcarriers k and k+m, the correlation between the impulse responses is expressed as:

$$h_k[n]h^*_{k+m}[n] = \alpha_k \alpha^*_{k+m} |R_g[n]|^2 \exp\left(-2\pi j \frac{m\delta}{M}\right) \quad (9)$$

The error estimator 621 calculates a correlation metric by summing the correlation terms on a plurality of subcarriers, that is:

$$T'[n] = \sum_k h_k[n]h^*_{k+m}[n] = |R_g[n]|^2 \exp\left(-2\pi j \frac{m\delta}{M}\right) \sum_k \alpha_k \alpha^*_{k+m} \quad (10)$$

When the transmission channel is little or not selective in frequency, that is when $\alpha_k \approx \alpha_{k+m}$, the error $\delta$ can be determined from the phase of $T'[n]$.

According to one alternative, if the receiver conducts a channel estimation for the different subcarriers, the coefficients $\alpha_k$ are not known. The error $\delta$ can be determined from $T'[n]$ and the term $$\sum_k \alpha_k \alpha^*_{k+m}.$$

In any case, the error estimator 621 should be capable of estimating the impulse response $k_k[n]$. This impulse response can be obtained from pilot symbols placed for example in the preamble of the useful data packet.

In practice, the impulse response $h_k[n]$ has a time and frequency spread. The prototype filter is chosen such that this spread is relatively low.

For example, as the prototype filter, the filter defined by the following coefficients can be chosen:

$$h[n] = 1 + \sum_{k=1}^{K-1} (-1)^k H(k/L) \cos(2\pi kn/L) \text{ for } 1 \leq n \leq L-1 \quad (11)$$

$$h[0] = 0$$

with K=4; H(1/L)=0.972; H(2/L)=1/√2; H(3/L)=0.235.

In this case, the interference generated by a symbol at time $t_n$ by the subcarrier k can be viewed by means of the table:

|       | $t_{n-2}$ | $t_{n-1}$ | $t_n$ | $t_{n+1}$ | $t_{n+2}$ |
|-------|-----------|-----------|-------|-----------|-----------|
| k − 1 | −0.1250   | −0.2063j  | 0.24  | 0.2063j   | −0.1250   |
| k     | 0         | 0.5638    | 1     | 0.5638    | 0         |
| k + 1 | −0.1250   | 0.2063j   | 0.24  | −0.2063j  | −0.1250   |

It is understood that the interference generated by the symbol in question only extends on two sampling periods before and after said symbol and on a subcarrier on either side of the subcarrier k.

In order to obtain an unbiased estimation of the impulse response $h_k[n]$, a guard ring is advantageously provided around each pilot symbol, in time and frequency.

In the case of the spread indicated above, the guard ring will have a time extent of two sampling periods before and after the pilot symbol and a frequency extent of one subcarrier on either side of the same.

Figure 9:
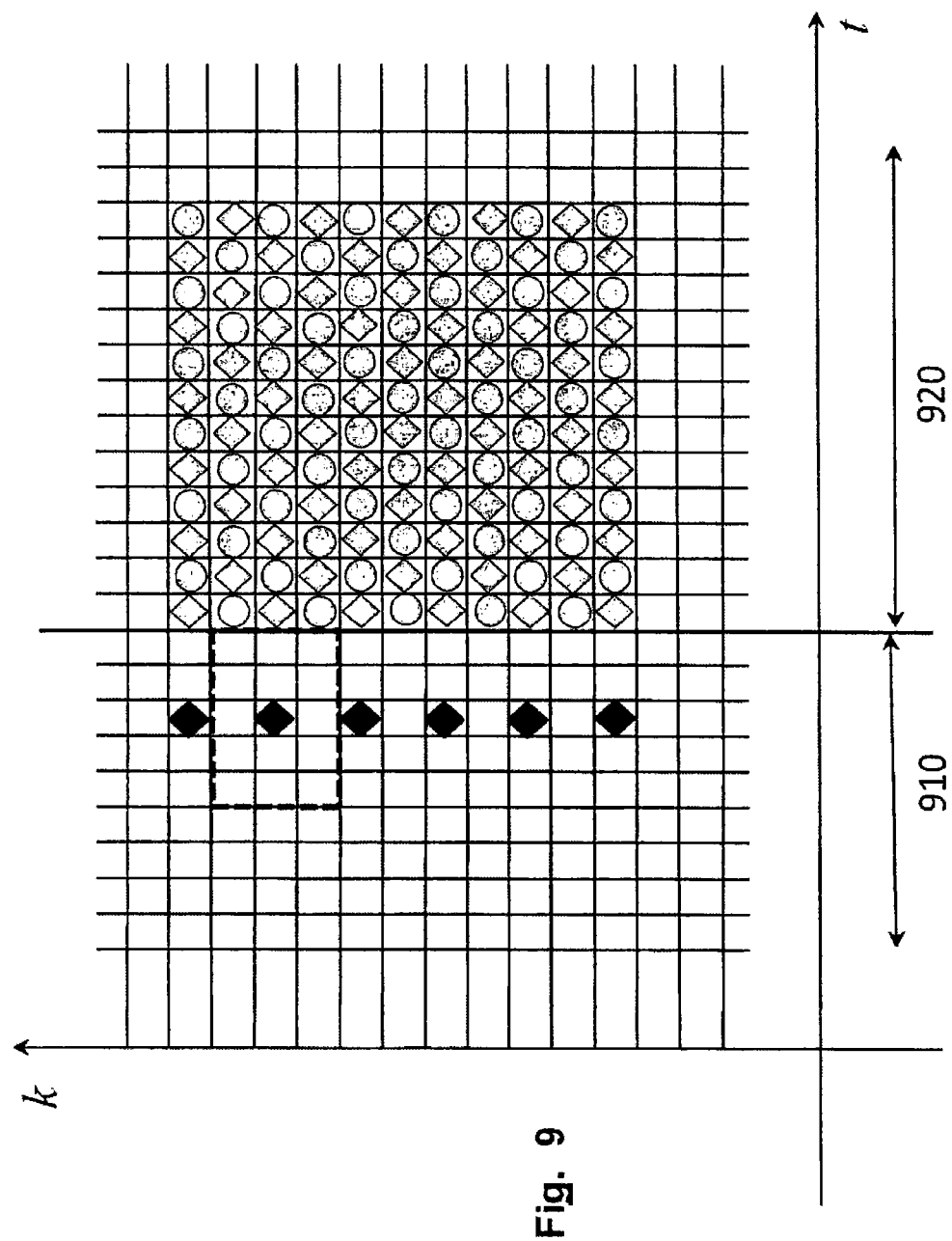
FIG. 9 represents a signal frame received by the FBMC receiver.

FIG. 9 schematically represents a frame of the signal received by the receiver. This frame comprises a preamble 910, followed by a useful data packet 920. The preamble comprises pilot symbols indicated by black diamonds. The useful data are indicated by grey diamonds (for the imaginary values) and grey circles (for real values).

Alternatively, the pilot symbols can be incorporated within the useful data packet.

It has been seen previously that the receiver synchronization includes, on the one hand, the sampling setting and on the other hand, the determination of the beginning of each useful data packet.

If the frame format of FIG. 9 is used, that is a preamble including pilot symbols on some subcarriers only, called active subcarriers, the beginning of the packet is detected as follows:

the energy is calculated on all the active subcarriers;
when this energy is higher than a predetermined threshold value, a time window of Q samples is opened from the instant when the threshold is crossed;
then, within this window, the instant when the energy maximum of the received signal is reached is searched for, which maximum corresponds substantially to the beginning to the useful packet. $n_{max}$ denotes the rank of the sample corresponding to the instant when this maximum is reached. To refine the estimation of this instant, the metric values $T[n_{max}]$, $T[n_{max}-1]$, $T[n_{max}+1]$ can be calculated and the parabolic interpolation described above can be made. The instant $(n_{max}+\delta)T$ then gives accurately the instant corresponding to the first sample of the packet. It will be understood that the beginning of the packet and the sampling instant are consequently jointly determined.

Figure 10:
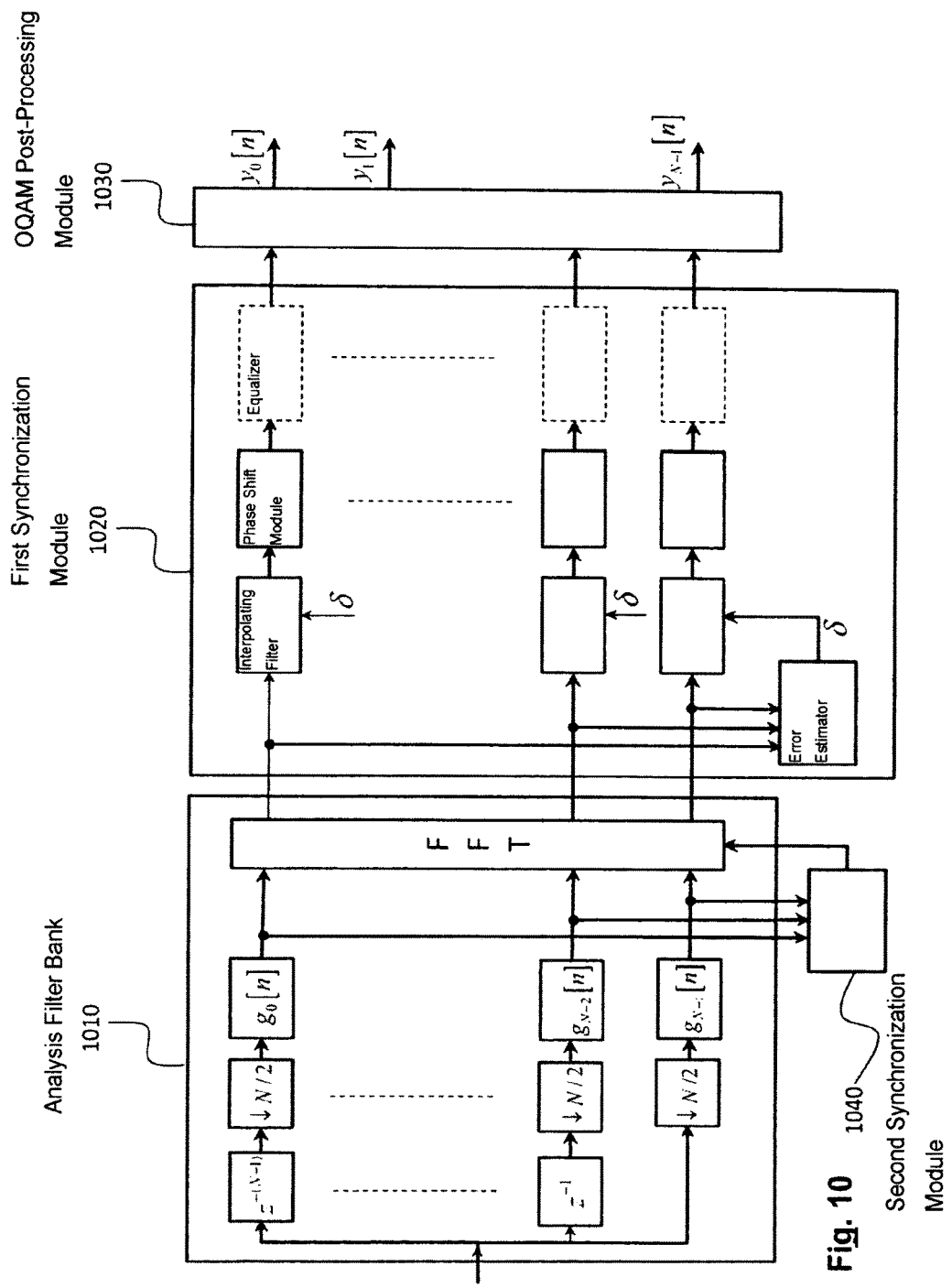
FIG. 10 schematically represents a FBMC receiver using a synchronization method in the time and frequency domains, according to a second embodiment of the invention.

FIG. 10 schematically represents a FBMC receiver using a synchronization method in the time and frequency domains, according to a second embodiment of the invention.

As in the first embodiment, the receiver comprises an analysis filter bank 1010, a first synchronization module 1020 operating in the frequency domain and an OQAM post-processing module 1030. The modules 1010, 1020, and 1030 are respectively identical to the modules 610, 620, and 630 of FIG. 6.

Unlike the first embodiment, the FBMC receiver of FIG. 10 comprises a second synchronization module 1040 operating in the time domain, in other words before the FFT.

This embodiment assumes that a synchronization sequence is present in the preamble. On the transmitter side, this synchronization sequence is incorporated in the preamble downstream of the IFFT module, on at least one subcarrier.

On the receiver side, the second synchronization module makes a correlation between the outputs of the analysis filters and the synchronization sequence. The correlation peak enables the beginning of the FFT to be determined. However, since this peak is generally weak and noisy, it is not possible to obtain accurately the sampling instant.

Advantageously, the second synchronization module makes a coarse synchronization and the first synchronization module makes a fine synchronization by means of an interpolation of the samples in the frequency domain as described within the scope of the first embodiment.

The invention claimed is:

1. A multi-carrier signal receiver configured to receive a multicarrier signal synthesized by a synthesis filter bank, said receiver comprising a sampling section for sampling the multicarrier signal at sampling instants, and an analysis filter bank comprising a plurality of analysis filters for analysing said sampled multicarrier signal, the outputs of the filters being connected to a Fourier transform module providing, for a plurality of subcarriers, samples in the frequency domain, the receiver comprising:

processing circuitry configured to provide
an error estimation module, receiving said samples for at least one subset of said plurality of subcarriers from the Fourier transform module, and providing an error on the sampling instants;
and, for each subcarrier of said plurality of subcarriers:
an interpolating filter, receiving the estimation of the error on the sampling instants and interpolating said samples on this subcarrier to provide an interpolated sample at an error-corrected sampling instant.

2. The receiver according to claim 1, wherein the receiver receives the multicarrier signal over a transmission channel and that the error estimation module makes, for each subcarrier of said at least one subset of sub carriers, an estimation of the impulse response of the synthesis filter bank, the transmission channel and the synthesis filter bank, at the frequency of this subcarrier and calculates a metric from the impulse response thus estimated.

3. The receiver according to claim 2, wherein the metric is a quadratic sum of said impulse responses for the subcarriers of said at least one subset, said metric being calculated at three consecutive sampling instants to give three metric values, the error estimation module determining the instant at which a parabolic function, passing through the three metric values at these three instants, reaches its maximum and by deducing therefrom the error on the sampling instants.

4. The receiver according to claim 3, wherein the at least one subset of said plurality of subcarriers consists of subcarriers having the impulse response higher than a predetermined threshold.

5. The receiver according to claim 2, wherein the metric is a correlation of said impulse responses for the subcarriers of said at least one subset, the error estimation module determining the error on the sampling instants from the phase of the correlation result.

6. The receiver according to claim 1, wherein the interpolating filter uses a spline interpolation function, said function being identical for the plurality of subcarriers.

7. The receiver according to claim 1, wherein the interpolating filter uses a Lagrange interpolation polynomial which is identical for the plurality of subcarriers.

8. The receiver according to claim 1, wherein the receiver further comprises an OQAM post-processing module implemented by the processing circuitry and configured to receive the interpolated samples, an OQAM symbol being represented by two consecutive samples of a same subcarrier, the interpolating filter comprising a first module interpolating the real parts of a plurality of successive samples and a second module interpolating the imaginary parts of said plurality of successive samples.

9. The receiver according to claim 1, wherein, for each subcarrier, the interpolating filter is followed by a phase-shift module making a phase compensation of the interpolated samples by means of a multiplication by a phase term $\exp(-j\phi(k))$ where $\phi(k)$ is proportional to the frequency of the subcarrier (k) and to the error on the sampling instants.

10. The receiver according to claim 9, wherein, for each subcarrier, the phase-shift module is followed by an equalizer in the frequency domain.

11. The receiver according to claim 1, wherein said multicarrier signal consists of frames, each frame comprising a preamble followed by a useful data packet, the preamble comprising a plurality of pilot symbols on subcarriers, called active subcarriers, of said plurality of subcarriers, each pilot symbol being surrounded by a time and frequency guard ring, the receiver determining the energy received on said active subcarriers and opening a time window when this energy crosses a predetermined threshold, the receiver then determining the beginning of said packet when the energy of the received signal reaches a maximum.

12. The receiver according to claim 1, wherein said multicarrier signal consists of frames, each frame comprising a preamble followed by a useful data packet, the preamble comprising for at least one carrier, a synchronization sequence, the receiver comprising a synchronization module, implemented by the processing circuitry, in the time domain, said synchronization module receiving the samples at the input of the Fourier transform module and making a correlation between the samples input to the Fourier transform module and said synchronization sequence to obtain a correlation peak, and synchronizing the beginning of the Fourier transform from the position of the correlation peak thus obtained.

\* \* \* \* \*